(12) United States Patent
Hall et al.

(10) Patent No.: US 10,479,643 B2
(45) Date of Patent: Nov. 19, 2019

(54) CABLE-WINDING APPARATUS

(71) Applicants: David R. Hall, Provo, UT (US);
Jerome Miles, Spanish Fork, UT (US);
Joe Fox, Spanish Fork, UT (US);
Jedediah Knight, Provo, UT (US)

(72) Inventors: David R. Hall, Provo, UT (US);
Jerome Miles, Spanish Fork, UT (US);
Joe Fox, Spanish Fork, UT (US);
Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 290 days.

(21) Appl. No.: 15/608,569

(22) Filed: May 30, 2017

(65) Prior Publication Data
US 2018/0346281 A1 Dec. 6, 2018

(51) Int. Cl.
*B65H 75/48* (2006.01)
*B65H 75/38* (2006.01)
*H02G 11/02* (2006.01)

(52) U.S. Cl.
CPC .......... *B65H 75/486* (2013.01); *B65H 75/38* (2013.01); *H02G 11/02* (2013.01)

(58) Field of Classification Search
CPC .. B65H 75/486; B65H 75/38; B65H 75/4428; B65H 75/446; B65H 2701/34
See application file for complete search history.

(56) References Cited

U.S. PATENT DOCUMENTS

| | | | | |
|---|---|---|---|---|
| 2,000,536 | A | * | 5/1935 | Poeppelmeier .... B65H 35/0066 83/232 |
| 2007/0069455 | A1 | * | 3/2007 | Mazurek ............... B65B 43/145 271/264 |
| 2016/0345541 | A1 | * | 12/2016 | Lai ....................... A01K 27/004 |
| 2018/0093852 | A1 | * | 4/2018 | Morey ............... B65H 75/4452 |

* cited by examiner

*Primary Examiner* — Michael E Gallion

(57) ABSTRACT

Embodiments of a cable-winding apparatus are described herein. The apparatus may include one or more of a securing surface, a cable-winding channel, a coil spring, and a ratchet mechanism. The cable-winding channel may be rotatably connected to the securing surface. The channel may include a base and two or more walls extending at least partially perpendicularly from the base along opposite sides of the base. The ratchet mechanism may include one or more of a first face gear and a second face gear. The first and second face gears may each include a plurality of ratchet teeth. The spring may force the channel away from the securing surface. The ratchet teeth may prevent rotation of the channel with respect to the securing surface in a first direction while permitting rotation of the channel with respect to the securing surface in a second direction opposite the first direction.

12 Claims, 19 Drawing Sheets

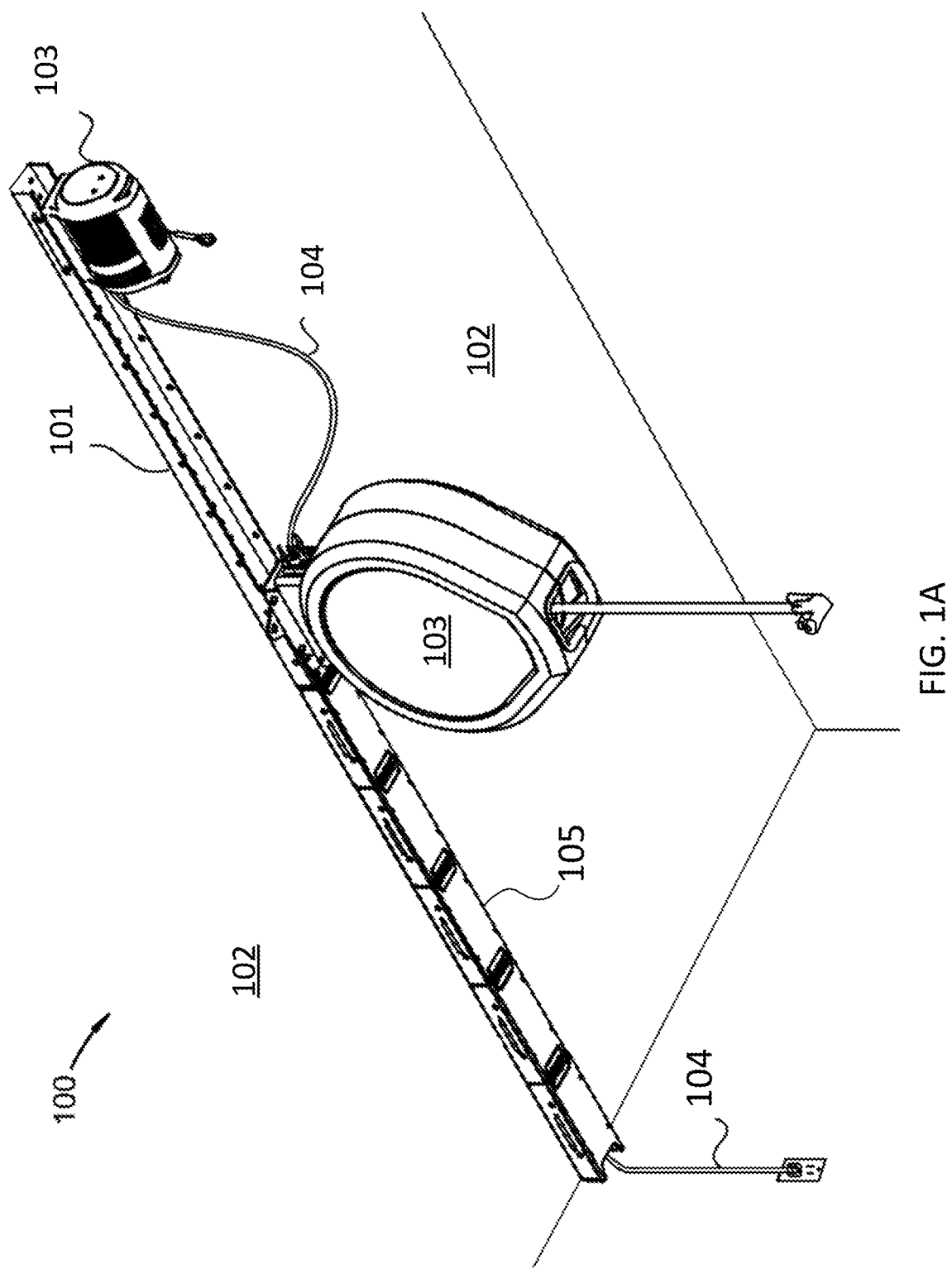

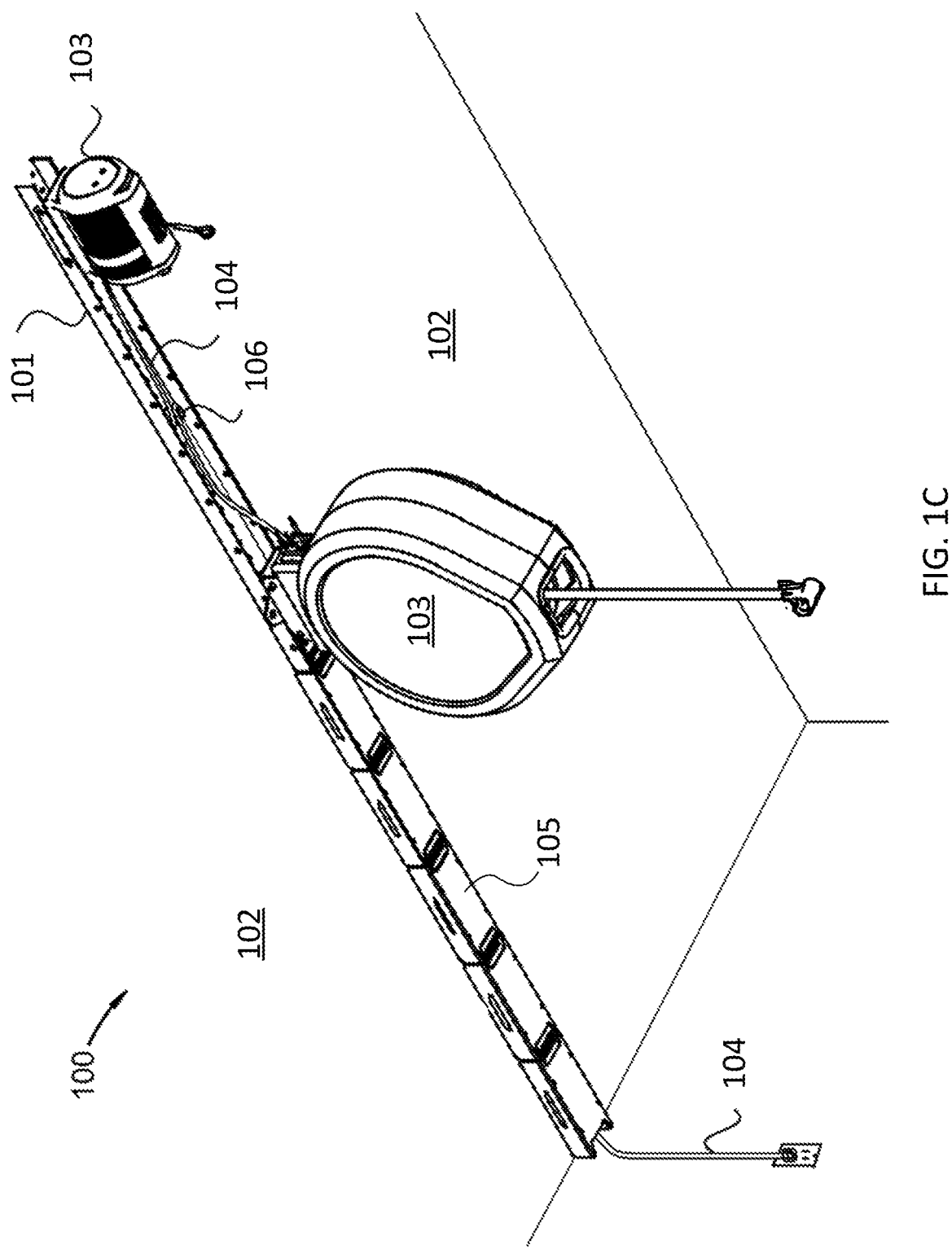

CABLE-WINDING APPARATUS

TECHNICAL FIELD

This invention relates generally to cable management.

BACKGROUND

Garage organization is, for some, the bane of homeownership. The struggle to organize many tools and miscellaneous items of greatly varying shapes and sizes has led to some innovation in garage storage systems. However, most systems are based on the similar concept of creating an overhead floor on which store things. This may be convenient for items that are not frequently used, but is sorely inadequate for items that are frequently accessed, especially for tools. Tools may be stored in more convenient, ground-based boxes or in cabinets, but this may be inconvenient for regularly used tools such as power cords, speakers, compact lifters, and lights, among others. It may be convenient to store such tools in an out-of-the-way location and still have ready access to them. Such a need is amplified by the fact that remote control of such tools is becoming more common. Thus, there is room for improvement in garage organization solutions.

SUMMARY OF THE INVENTION

Embodiments of a cable-winding apparatus are described herein. In general, the apparatus may be employed as part of a garage and/or tool organizations and/or storage system. The apparatus may include one or more of a securing surface, a cable-winding channel, a coil spring, and a ratchet mechanism. The cable-winding channel may be rotatably connected to the securing surface. The channel may include a base and two or more walls extending at least partially perpendicularly from the base along opposite sides of the base. The at least partially perpendicular walls of the cable-winding channel may comprise non-planar walls selected from the group consisting of ridges, grooves, channels, undulations, knurles, flutes, indentations, depressions, and hatches, or combinations thereof. The coil spring may be fixed at a first end to the channel base opposite the channel walls. The coil spring may be fixed at a second end to the securing surface. The ratchet mechanism may be disposed in the spring. The ratchet mechanism may include one or more of a first face gear and a second face gear. The first face gear may be fixed to the channel by a rod. The rod fixing the first face gear to the channel may pass through the second face gear. The first face gear may include a plurality of first ratchet teeth. The plurality of first ratchet teeth may face the channel. The second face gear may be fixed to the securing surface. The second face gear may include a plurality of second ratchet teeth. The plurality of second ratchet teeth may face the securing surface. The coil spring may force the channel away from the securing surface. The coil spring may force the plurality of first ratchet teeth against the plurality of second ratchet teeth such that the pluralities of first and second ratchet teeth prevent rotation of the channel with respect to the securing surface in a first direction while permitting rotation of the channel with respect to the securing surface in a second direction opposite the first direction.

The apparatus may include one or more of a securing surface, a cable-winding channel, and a ratchet mechanism. The cable-winding channel may be rotatably connected to the securing surface. The channel may include a base and two or more walls extending at least partially perpendicularly from the base along opposite sides of the base. The at least partially perpendicular walls of the cable-winding channel may comprise non-planar walls selected from the group consisting of ridges, grooves, channels, undulations, knurles, flutes, indentations, depressions, and hatches, or combinations thereof. The ratchet mechanism may be disposed between the channel and the securing surface. The ratchet mechanism may include one or more of a first face gear and a second face gear. The first face gear may be fixed to the channel by a rod. The rod fixing the first face gear to the channel may pass through the second face gear. The first face gear may include a plurality of first ratchet teeth. The plurality of first ratchet teeth may face the channel. The second face gear may be fixed to the securing surface. The second face gear may include a plurality of second ratchet teeth. The plurality of second ratchet teeth may face the securing surface. A weight of the channel may force the channel away from the securing surface. The weight of the channel may force the plurality of first ratchet teeth against the plurality of second ratchet teeth such that the pluralities of first and second ratchet teeth prevent rotation of the channel with respect to the securing surface in a first direction while permitting rotation of the channel with respect to the securing surface in a second direction opposite the first direction.

The securing surface may include a second channel. The cable-winding channel may be disposed within the second channel. The cable-winding channel may be disposed completely within the second channel. The second channel may include a device-mounting channel. The device-mounting channel may include one or more surface-mounting openings. Screws may pass through the surface-mounting openings and mount the device-mounting channel to a surface. The device-mounting channel may include one or more device-mounting openings by which one or more devices are mounted to the device-mounting channel. The second channel may include a second-channel base, two second channel walls, and at least one detent. The second-channel walls may extend perpendicularly from opposite sides of the second-channel base. The detent may protrude from an inner surface, an outer surface, or both, of each second-channel wall.

One or more teeth of the pluralities of first and second ratchet teeth may include a first side and a second side. The first side may be oriented perpendicular to a face of the corresponding face gear. The second side may intersect the face of the corresponding face gear at an angle ranging from one degree to 80 degrees.

In spring-biased embodiments, the spring may store torsional energy as the first and second face gears are engaged. The spring may rotate the second channel with respect to the first channel as the first and second face gears are disengaged.

The apparatus may further include an articulating lid. The articulating lid may be connected to one of the cable-winding channel walls by a hinge. The articulating lid may be connected to another of the cable-winding channel walls by a latch. The lid may be disposed opposite the base. The articulating lid may include a rotatable plate facing away from the cable-winding channel. Pressure on the plate may disengage the pluralities of first and second ratchet teeth. In spring-biased embodiments, the spring may rotate the channel with respect to the securing surface and the rotatable plate as the spring stores torsional energy and a pressure is exerted on the plate disengaging the pluralities of first and second ratchet teeth.

The channel may include one or more fingers. The one or more fingers may extend outwards from at least one of the walls. A force on the finger may rotate the channel about an axis passing through the first and second face gears perpendicular to a face of each of the first and second face gears.

BRIEF DESCRIPTION OF THE DRAWINGS

A more particular description of the apparatus summarized above is made below generally and by reference to specific embodiments. Several embodiments are depicted in drawings included with this application, in which:

FIGS. 1A-D depict an overhead mounting system in which the cable-winding apparatus described herein may be useful;

DETAILED DESCRIPTION

Figure 1B:
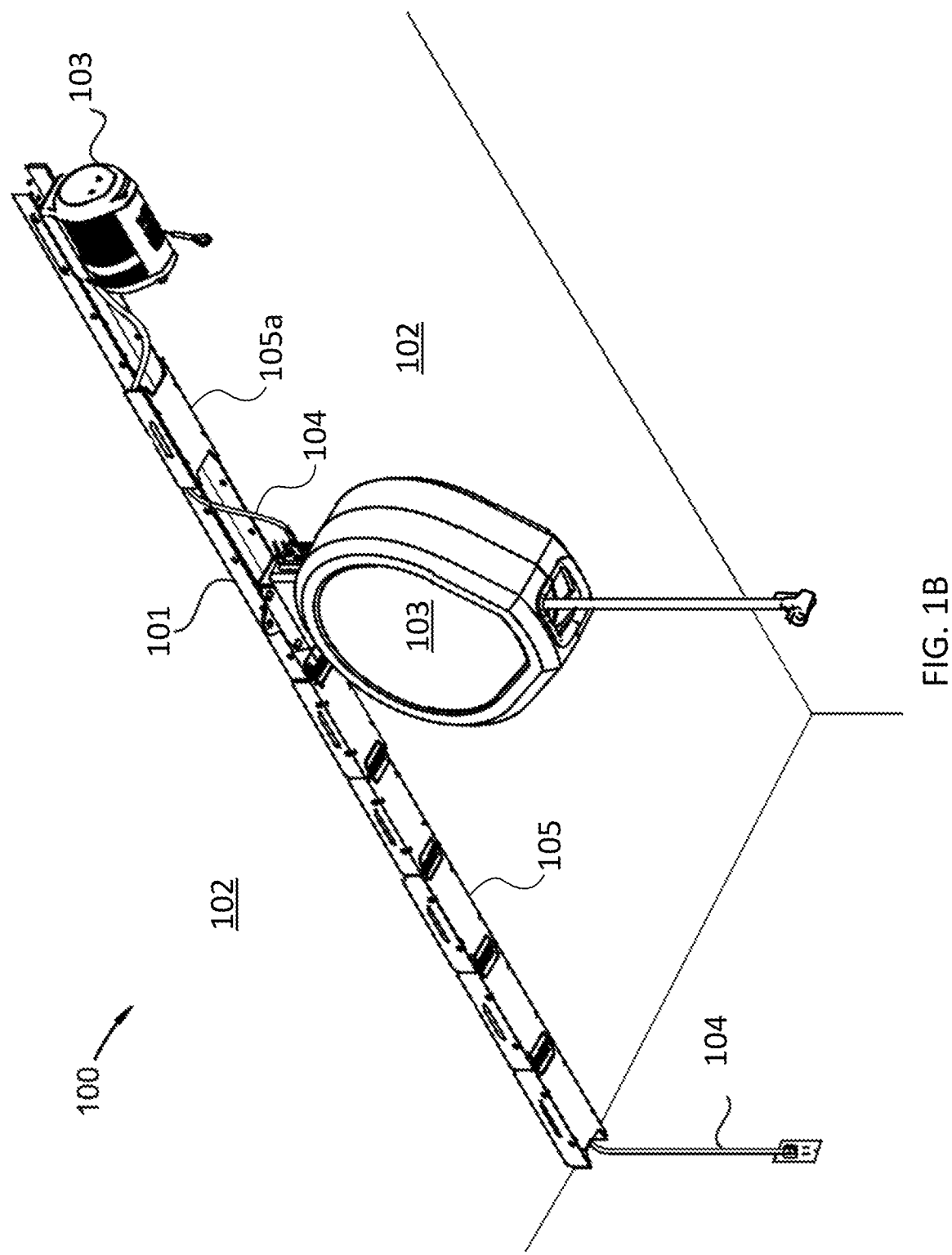

A detailed description of embodiments of an apparatus is provided below by example, with reference to embodiments in the appended figures. Those of skill in the art will recognize that the features of the apparatus as described by example in the figures below could be arranged and designed in a variety of different configurations without departing from the scope of the claims. Thus, the detailed description below and the depictions of embodiments in the figures is representative of the apparatus described in the claims, and is not intended to limit the scope of the claims.

Embodiments of a cable-winding apparatus are described herein. In general, the apparatus may be employed as part of a garage and/or tool organizations and/or storage system. The apparatus may include one or more of a securing surface, a cable-winding channel, a coil spring, and a ratchet mechanism. The cable-winding channel may be rotatably connected to the securing surface. The channel may include a base and two or more walls extending at least partially perpendicularly from the base along opposite sides of the base. The coil spring may be fixed at a first end to the channel base opposite the channel walls. The coil spring may be fixed at a second end to the securing surface. The ratchet mechanism may be disposed in the spring. The ratchet mechanism may include one or more of a first face gear and a second face gear. The first face gear may be fixed to the channel by a rod. The rod fixing the first face gear to the channel may pass through the second face gear. The first face gear may include a plurality of first ratchet teeth. The plurality of first ratchet teeth may face the channel. The second face gear may be fixed to the securing surface. The second face gear may include a plurality of second ratchet teeth. The plurality of second ratchet teeth may face the securing surface. The coil spring may force the channel away from the securing surface. The coil spring may force the plurality of first ratchet teeth against the plurality of second ratchet teeth such that the pluralities of first and second ratchet teeth prevent rotation of the channel with respect to the securing surface in a first direction while permitting rotation of the channel with respect to the securing surface in a second direction opposite the first direction.

The apparatus may include one or more of a securing surface, a cable-winding channel, and a ratchet mechanism. The cable-winding channel may be rotatably connected to the securing surface. The channel may include a base and two or more walls extending at least partially perpendicularly from the base along opposite sides of the base. The at least partially perpendicular walls of the cable-winding channel may comprise non-planar walls selected from the group consisting of ridges, grooves, channels, undulations, knurles, flutes, indentations, depressions, and hatches, or combinations thereof. The ratchet mechanism may be disposed between the channel and the securing surface. The ratchet mechanism may include one or more of a first face gear and a second face gear. The first face gear may be fixed to the channel by a rod. The rod fixing the first face gear to the channel may pass through the second face gear. The first face gear may include a plurality of first ratchet teeth. The plurality of first ratchet teeth may face the channel. The second face gear may be fixed to the securing surface. The second face gear may include a plurality of second ratchet teeth. The plurality of second ratchet teeth may face the securing surface. A weight of the channel may force the channel away from the securing surface. The weight of the channel may force the plurality of first ratchet teeth against the plurality of second ratchet teeth such that the pluralities of first and second ratchet teeth prevent rotation of the channel with respect to the securing surface in a first direction while permitting rotation of the channel with respect to the securing surface in a second direction opposite the first direction.

The securing surface may include a second channel. The cable-winding channel may be disposed within the second channel. The cable-winding channel may be disposed completely within the second channel. The second channel may include a device-mounting channel. The device-mounting channel may include one or more surface-mounting openings. Screws may pass through the surface-mounting openings and mount the device-mounting channel to a surface. The device-mounting channel may include one or more device-mounting openings by which one or more devices are mounted to the device-mounting channel. The second channel may include a second-channel base, two second channel walls, and at least one detent. The second-channel walls may extend perpendicularly from opposite sides of the second-channel base. The detent may protrude from an inner surface, an outer surface, or both, of each second-channel wall.

One or more teeth of the pluralities of first and second ratchet teeth may include a first side and a second side. The first side may be oriented perpendicular to a face of the corresponding face gear. The second side may intersect the face of the corresponding face gear at an angle ranging from one degree to 80 degrees.

In spring-biased embodiments, the spring may store torsional energy as the first and second face gears are engaged. The spring may rotate the second channel with respect to the first channel as the first and second face gears are disengaged.

The apparatus may further include an articulating lid. The articulating lid may be connected to one of the cable-winding channel walls by a hinge. The articulating lid may be connected to another of the cable-winding channel walls by a latch. The lid may be disposed opposite the base. The articulating lid may include a rotatable plate facing away from the cable-winding channel. Pressure on the plate may disengage the pluralities of first and second ratchet teeth. In spring-biased embodiments, the spring may rotate the channel with respect to the securing surface and the rotatable plate as the spring stores torsional energy and a pressure is exerted on the plate disengaging the pluralities of first and second ratchet teeth.

The channel may include one or more fingers. The one or more fingers may extend outwards from at least one of the walls. A force on the finger may rotate the channel about an axis passing through the first and second face gears perpendicular to a face of each of the first and second face gears.

Various elements described herein may be similar to those described in U.S. patent application Ser. No. 15/487,999 by David Hall et al. for "Overhead Mounting System" and U.S. patent application Ser. No. 15/488,860 by David Hall et al. for "Overhead Mounting System for Daisy-Chained Devices." Accordingly, the entirety of each application is incorporated herein by reference.

The apparatus generally described above is described by example below with regard to specific embodiments depicted in the FIGS. Similar languages used above to describe the apparatus generally is used below to describe the specific embodiments.

Figure 1D:
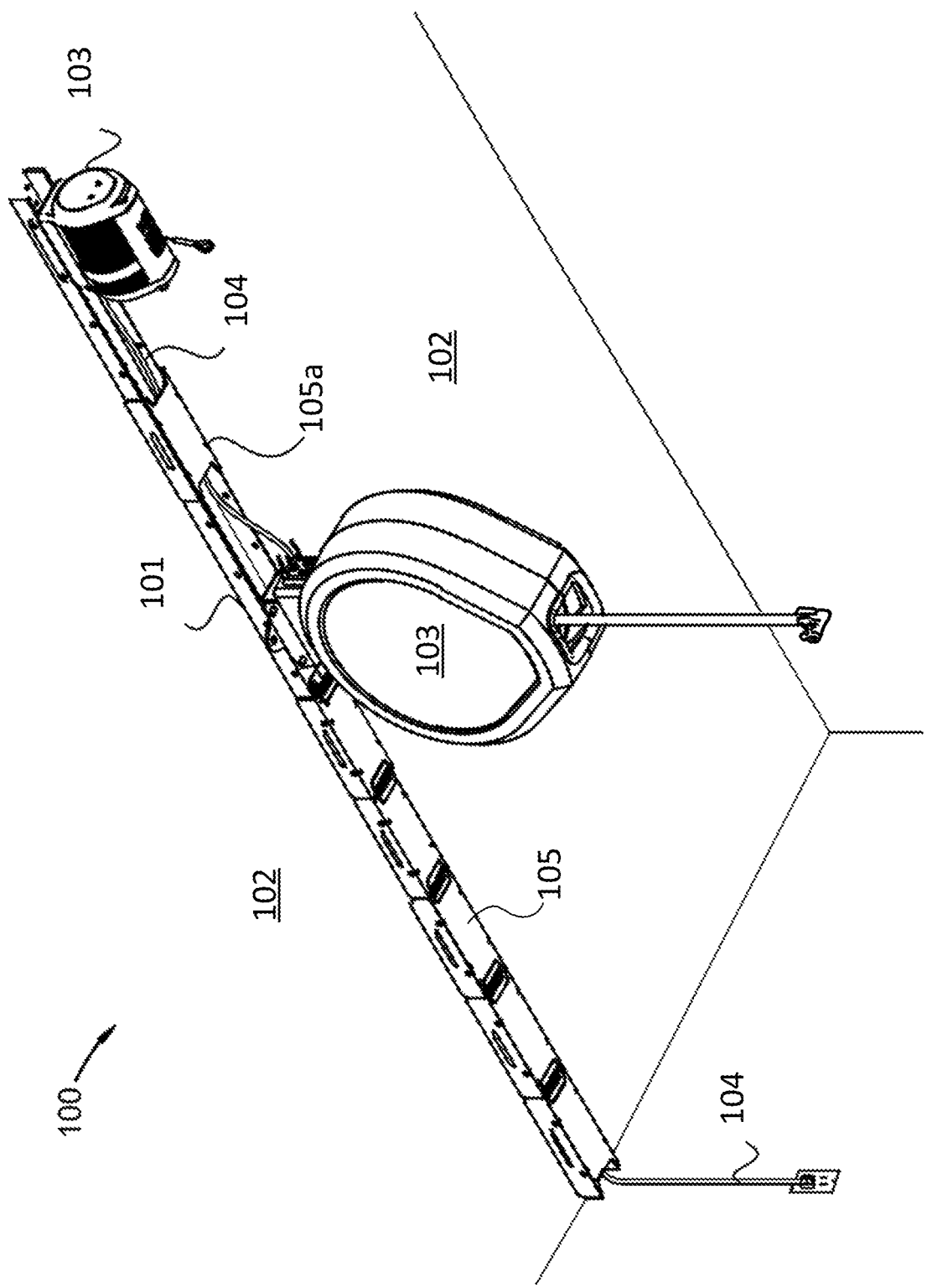

FIGS. 1A-D depict an overhead mounting system in which the cable-winding apparatus described herein may be useful. The system 100 includes, generally, a device-mounting channel 101 mounted to an overhead surface 102, various devices 103 connected to the channel 101, a cable 104 that provides power to the devices 103 and electrically connects the devices 103, channel covers 105, and a cable-winding mechanism 106. As shown in FIG. 1A, between the devices 103, the cable 104 hangs freely, unsupported. As shown in FIG. 1B, a cover 105a is mounted to the channel 101 between the devices 103 without first installing the cable-winding mechanism 106. Because the covers 105 wrap around the channel 101, there is nothing to retain the cable 104 within the channel 101. Accordingly, as shown, the cable 104 may get caught between the cover 105a and the channel 101. As shown in FIG. 1C, the cable-winding mechanism 106 is incorporated into the device-mounting channel 101, and the cable 104 is wrapped by the mechanism 106. As shown in FIG. 1D, the cover 105a is easily installed, and the mechanism 106 prevents the cable 104 from entangling with the cover 105a.

Figure 2A:
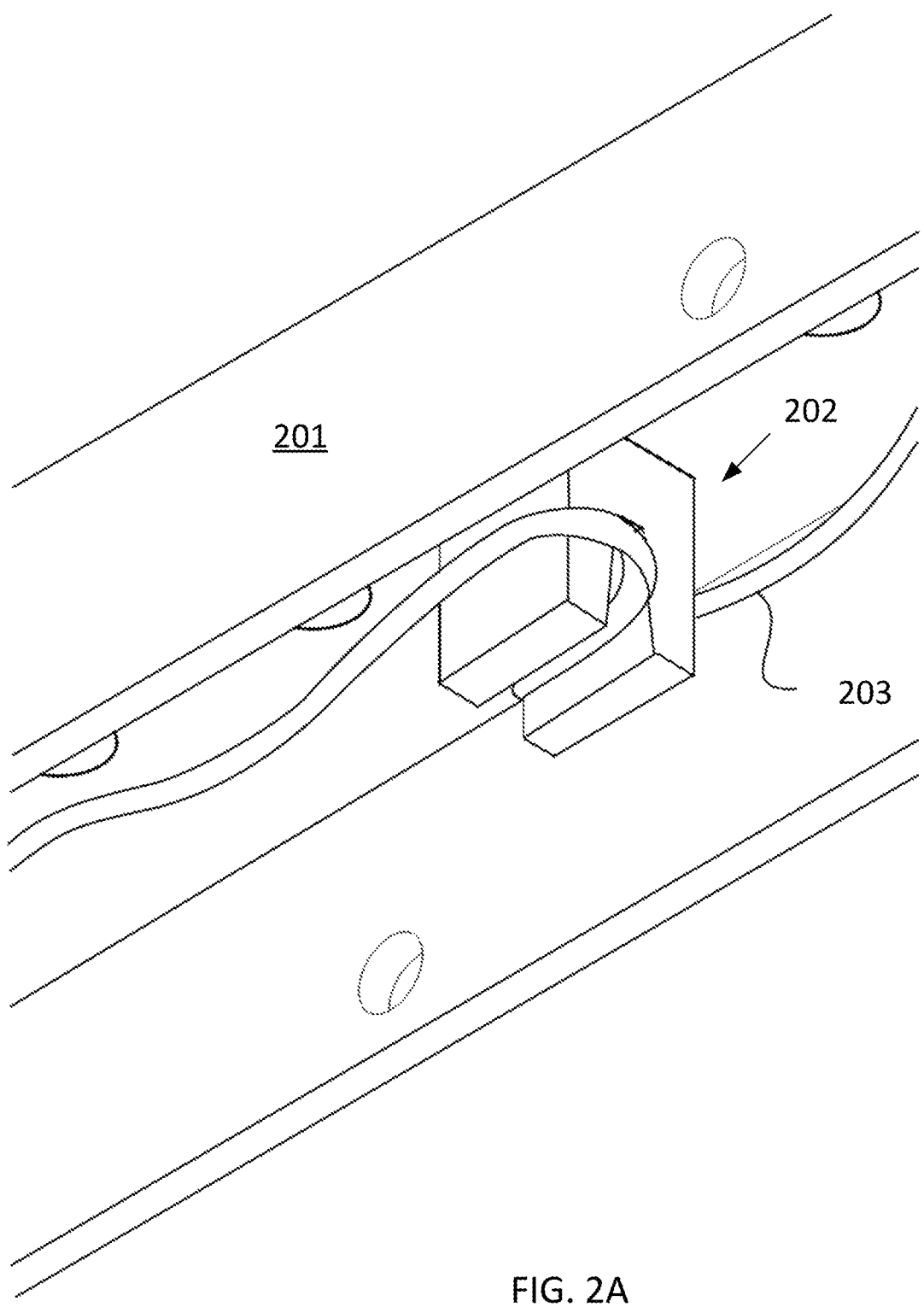
FIGS. 2A-C depict various embodiments of a cable-winding apparatus as described herein.
Figure 2B:
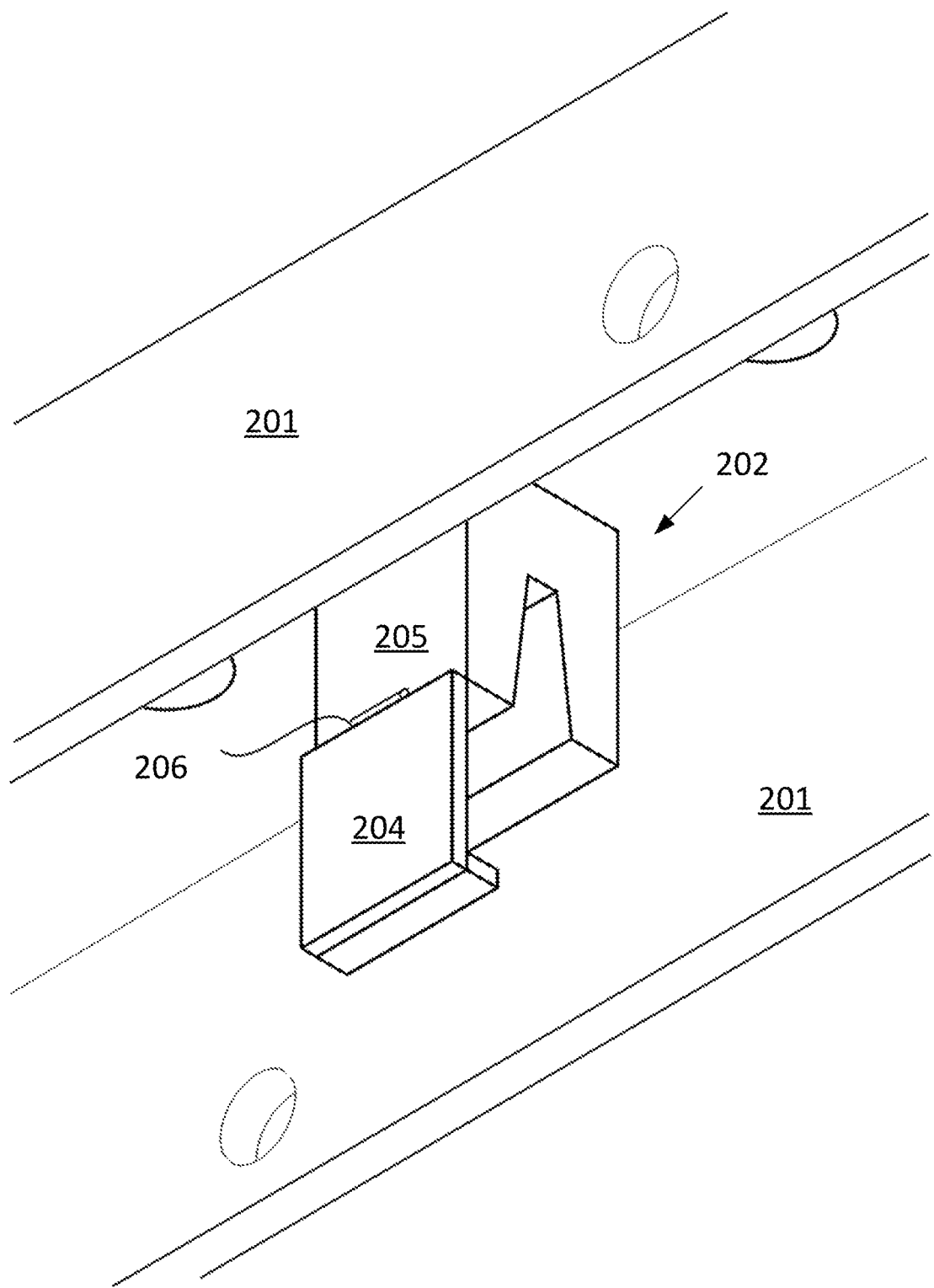
Figure 2C:
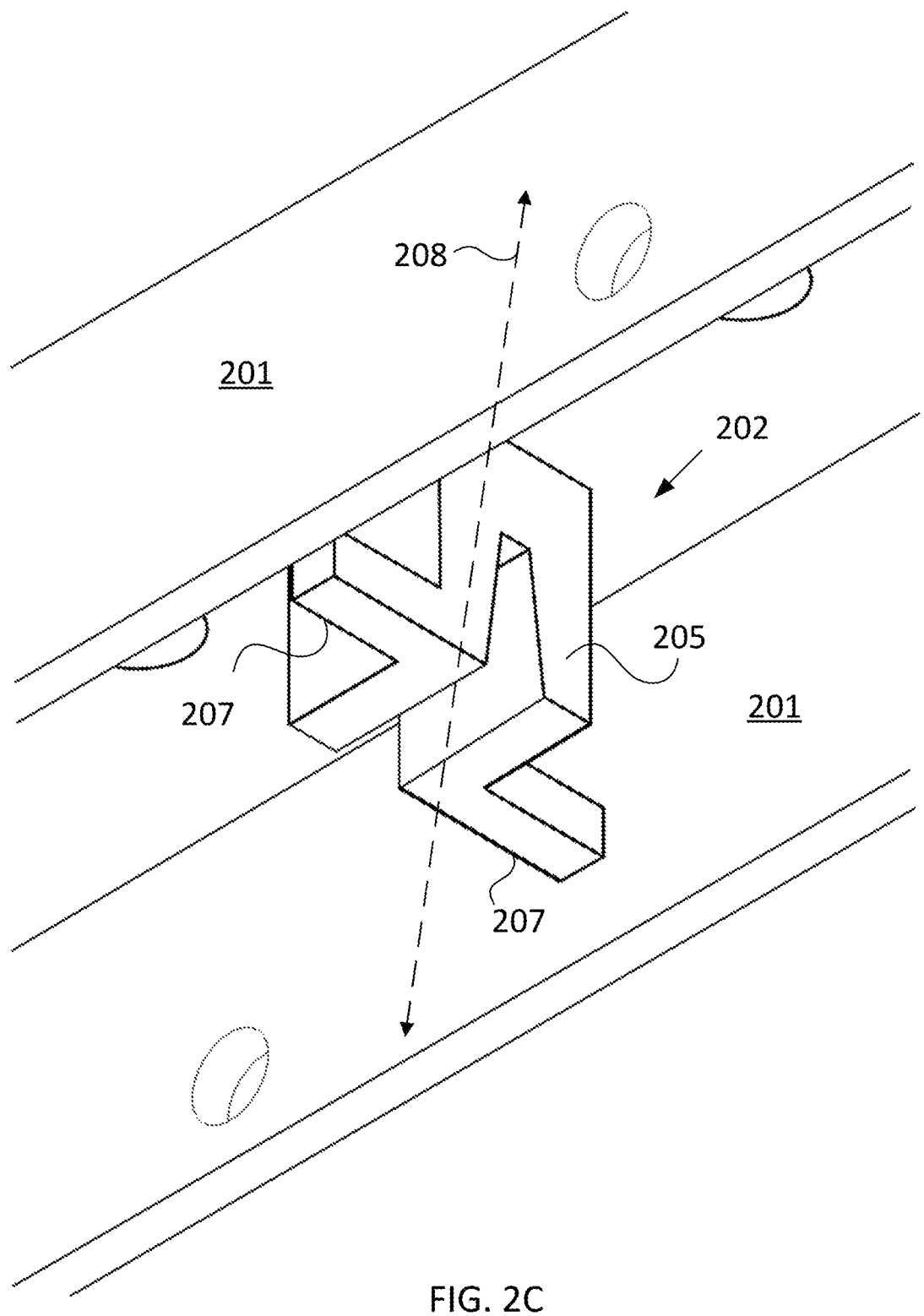
Figure 6:
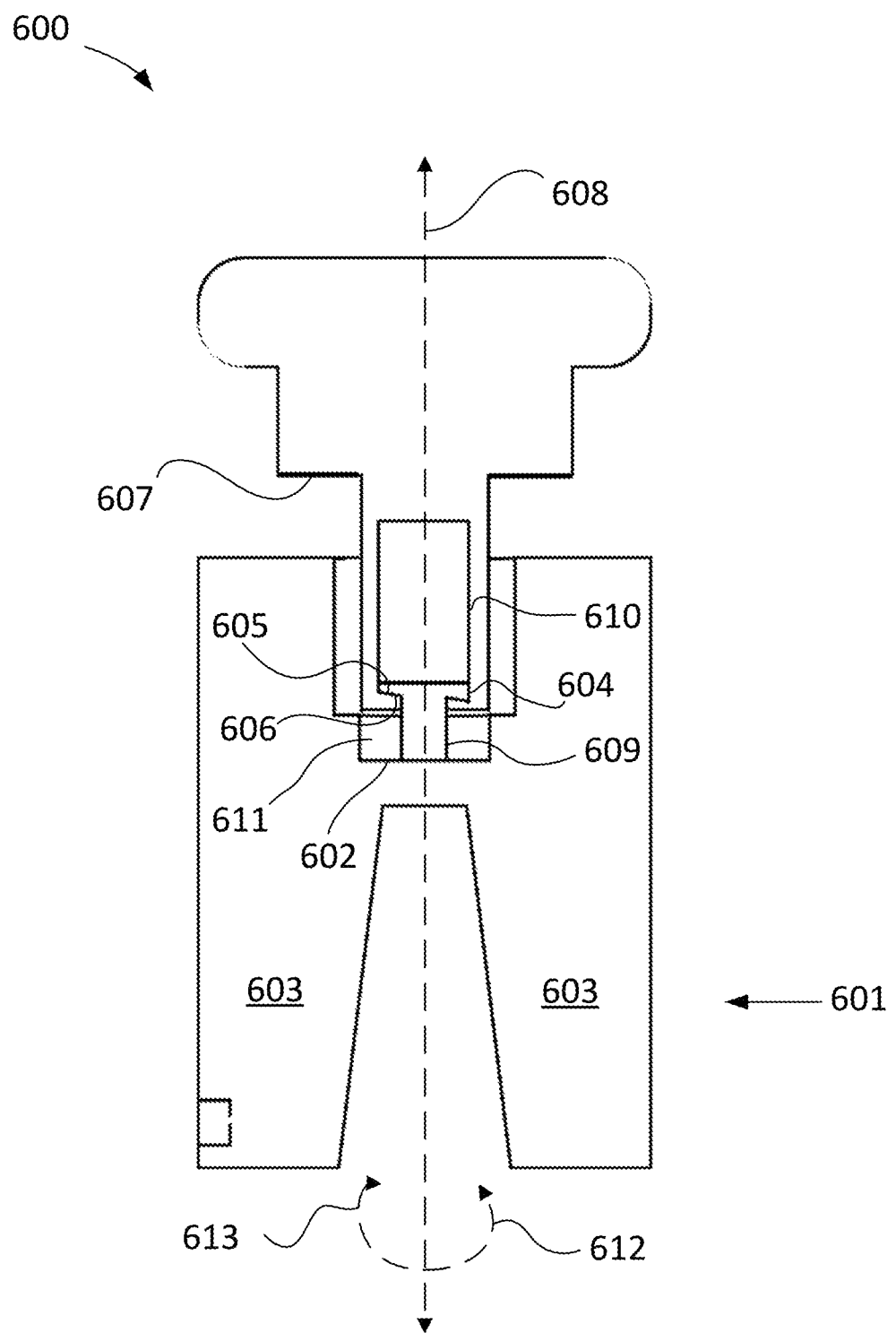
FIG. 6 depicts a cross-sectional view of a gravity-enabled cable-winding apparatus as described herein.

FIGS. 2A-C depict various embodiments of a cable-winding apparatus as described herein. The depictions generally show a device-mounting channel 201 and a cable-winding channel 202. The cable-winding channel 202 is disposed within the device-mounting channel 201. As shown in FIG. 2A, a cable 203 is also disposed within the device-mounting channel 201. The cable 203 passes through, and wraps around, the cable-winding channel 202. As shown in FIG. 2B, the cable-winding channel 202 includes an articulating lid 204 connected to one of the walls 205 of the cable-winding channel 202 by a hinge 206. As shown in FIG. 2C, the cable-winding channel 202 includes two fingers 207 extending outwards from the walls 205. A force exerted on the fingers 207 about the axis 208 causes the cable-winding channel 202 to rotate about its axis, such as is depicted in FIG. 6.

FIGS. 3A-D depict various views of cable-winding apparatus embodiments as described herein. The depictions generally show a device-mounting channel 301 and a cable-winding channel 302. The cable-winding channel 302 is disposed completely within the device-mounting channel 301.

Figure 3A:
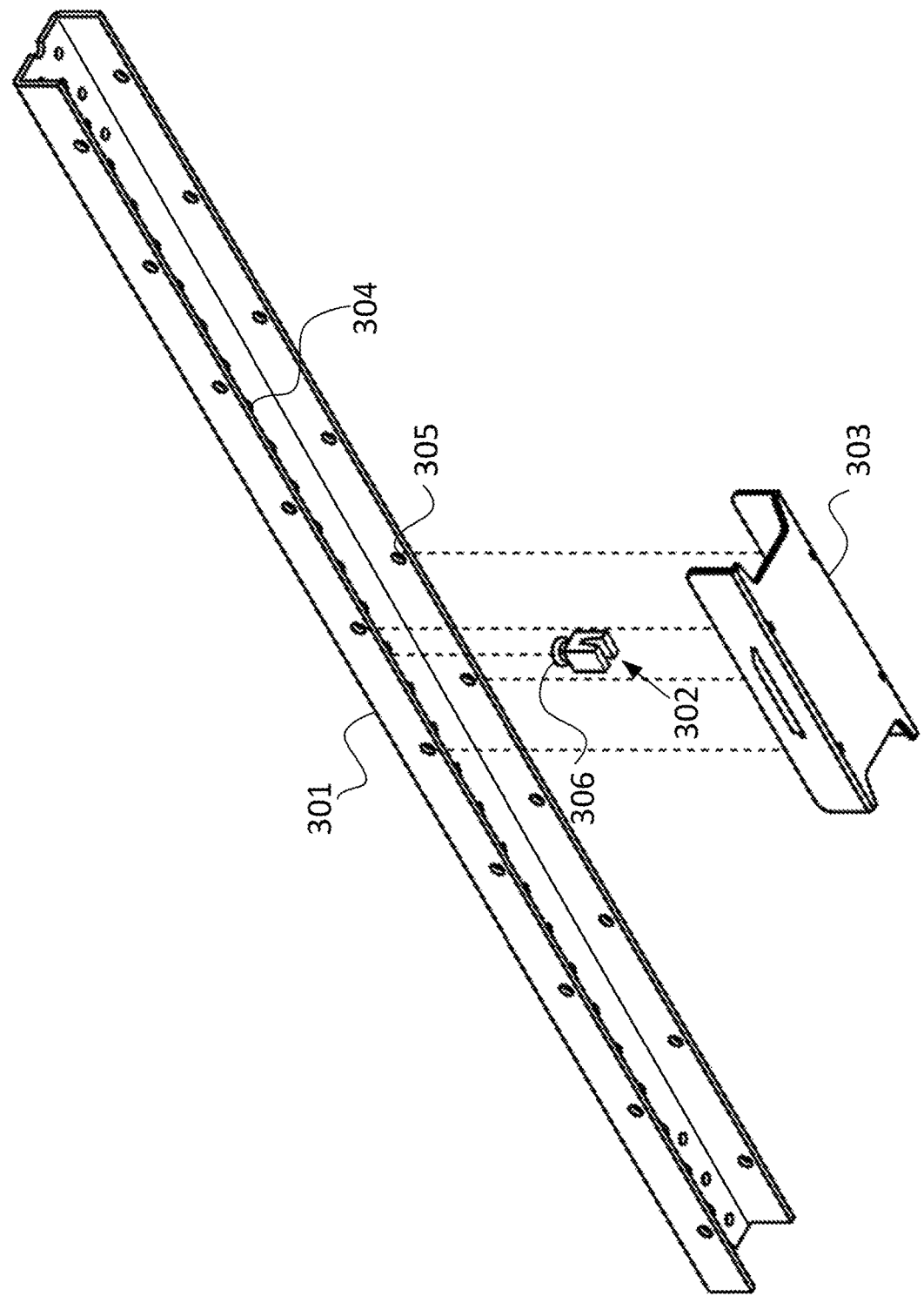
FIGS. 3A-D depict various views of cable-winding apparatus embodiments as described herein.
Figure 3B:
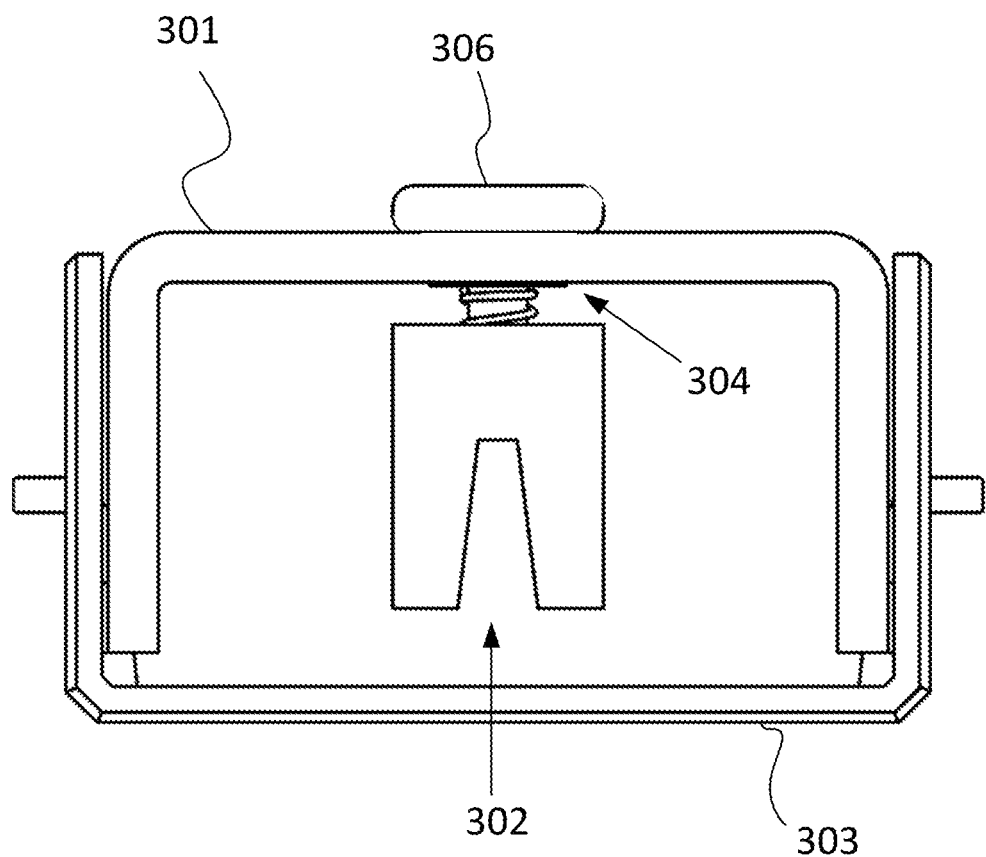

FIGS. 3A-B additionally depict a cover 303. The cover 303 mounts to the device-mounting channel 301 and hides the cable-winding channel 302. The cable-winding channel 302 may be connected to a second channel that acts as a securing surface for the cable-winding channel 302. For example, in FIGS. 3A-B, the device-mounting channel 301 acts as a securing surface to which the cable-winding channel 302 is secured. The device-mounting channel includes surface-mounting openings 304 through which screws pass. The screws may mount the device-mounting channel to a surface, such as is depicted in FIGS. 1A-D. The device-mounting also includes device-mounting openings 305 by which one or more devices are mounted to the device-mounting channel 301. The cover 303 may also mount to the device-mounting channel 301 by detents that protrude from the inner surfaces of the cover 303 into the device-mounting openings 305.

The cable-winding channel 302 may be rotatably secured to the device-mounting channel 301 by a locking pin 306. The locking pin 306 may fasten to one of the surface-mounting openings 304, or may otherwise be bonded to, or integrated with, the device-mounting channel 301. The locking pin 306 is rotatably attached to the cable-winding channel 302, such as is described regarding FIGS. 5A-B.

Figure 3C:
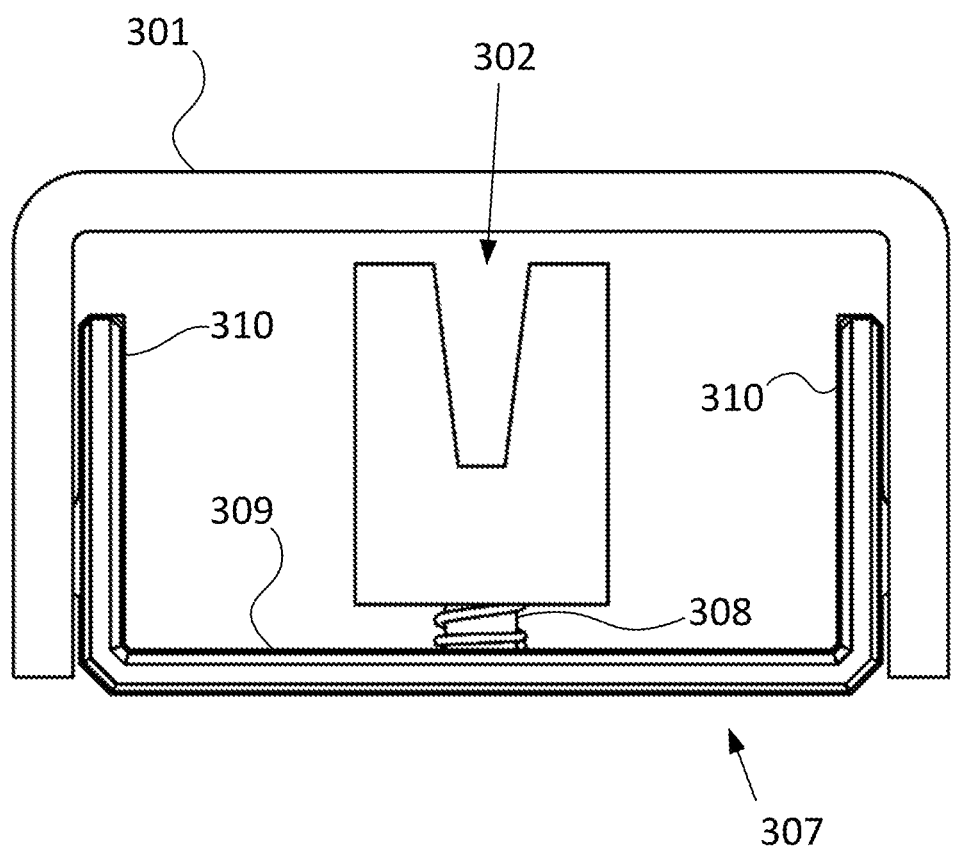

As shown in FIG. 3C, the cable-winding channel 302 is rotatably connected to a cradle 307 by a rod 308. The cradle 307 is one embodiment of the second channel. The cradle 307 includes a base 309 and two walls 310 extending perpendicularly from opposite sides of the base 309. Similar to the cover 303 depicted in FIGS. 1A-B, the cradle 307 mounts to the device-mounting channel by detents that protrude from outside surfaces of the walls 310 and into the device-mounting openings 305.

Figure 3D:
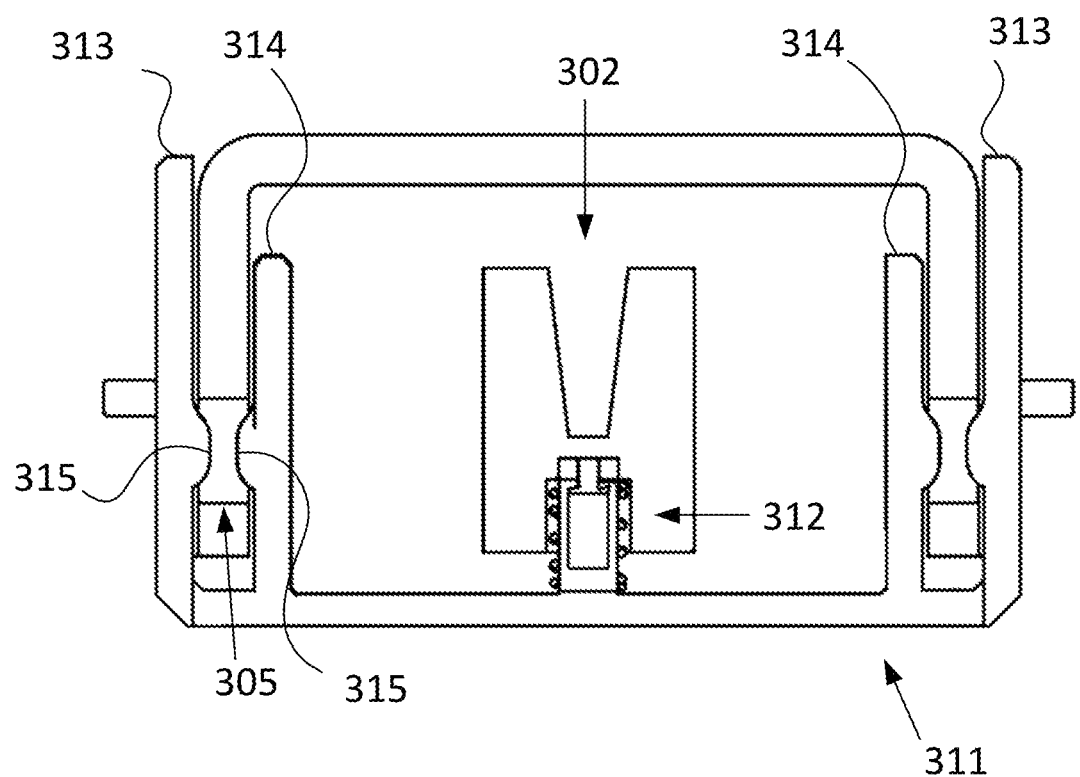

FIG. 3D depicts a partial cross-sectional view. The cable-winding channel 302 is connected to a hybrid cover-cradle 311 by a ratcheting mechanism 312 (described in more detail below). The hybrid cover-cradle 311 is one embodiment of the second channel. The hybrid cover-cradle 311 includes outer walls 313 and inner walls 314. Similar to the cover 303 and the cradle 307, detents 315 protrude from the walls 313, 314 into the device-mounting openings 305.

Figure 4A:
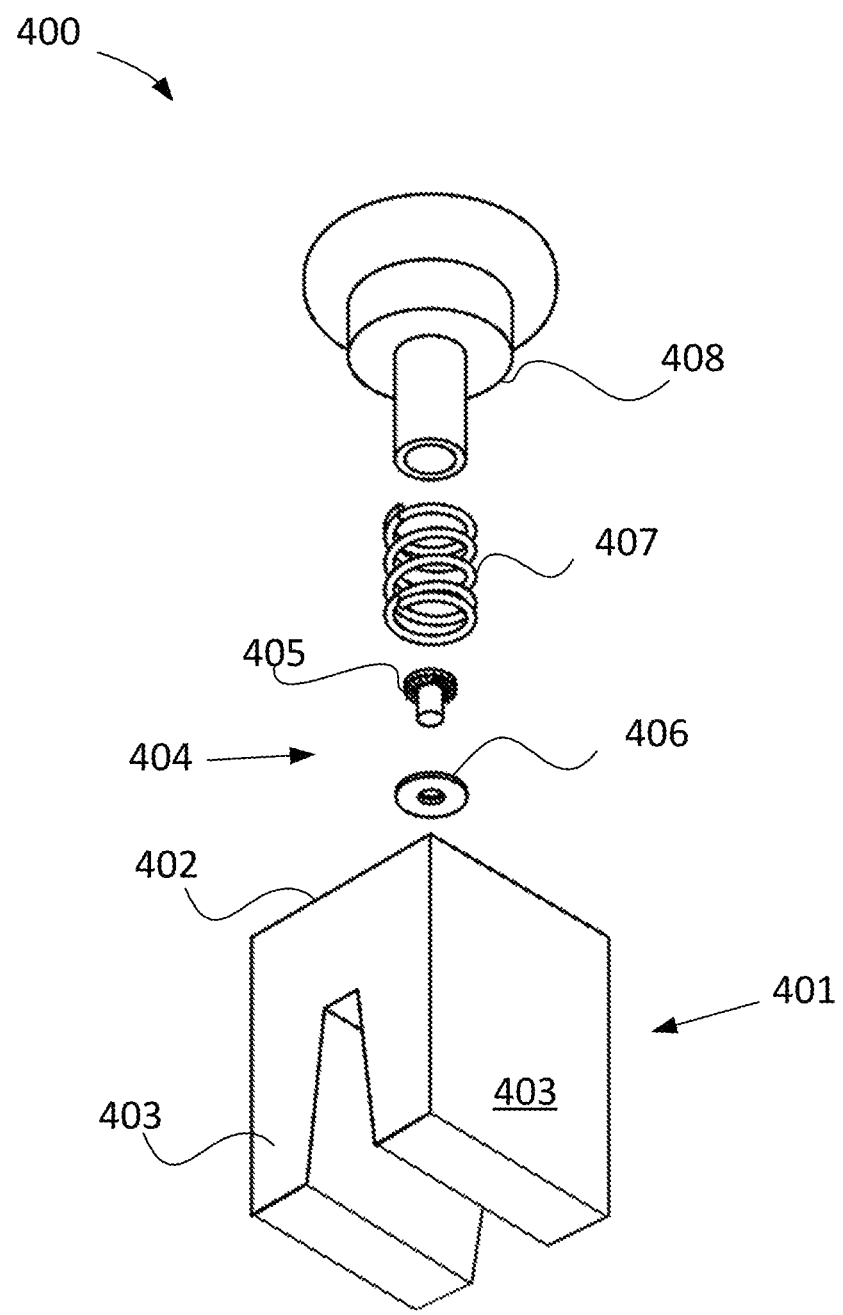
FIGS. 4A-B depict two exploded views of a cable-winding apparatus as described herein.
Figure 4B:
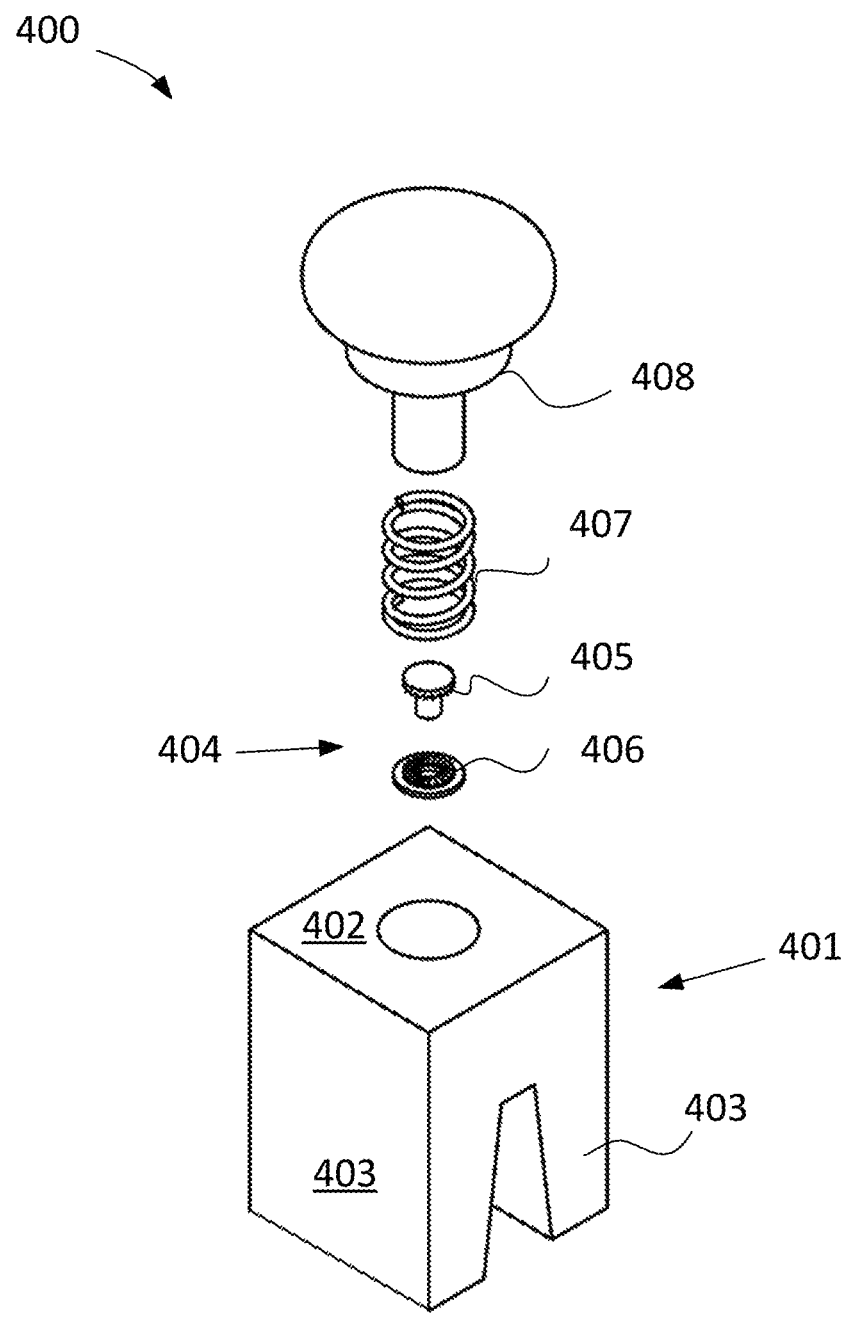

FIGS. 4A-B depict two exploded views of a cable-winding apparatus as described herein. The apparatus 400 includes a channel 401 having a base 402 and two walls 403 extending perpendicularly from the base 402 along opposite sides of the base 402; a ratchet mechanism 404 having a first face gear 405 and a second face gear 406; a coil spring 407; and a securing surface 408. The first face gear 405 includes a plurality of ratchet teeth facing the channel 401. The second face gear 406 similarly includes a plurality of ratchet teeth facing the securing surface. The teeth are described and depicted in more detail regarding FIG. 8. The at least partially perpendicular walls of the cable-winding channel may comprise non-planar walls selected from the group consisting of ridges, grooves, channels, undulations, knurles, flutes, indentations, depressions, and hatches, or combinations thereof.

Figure 5A:
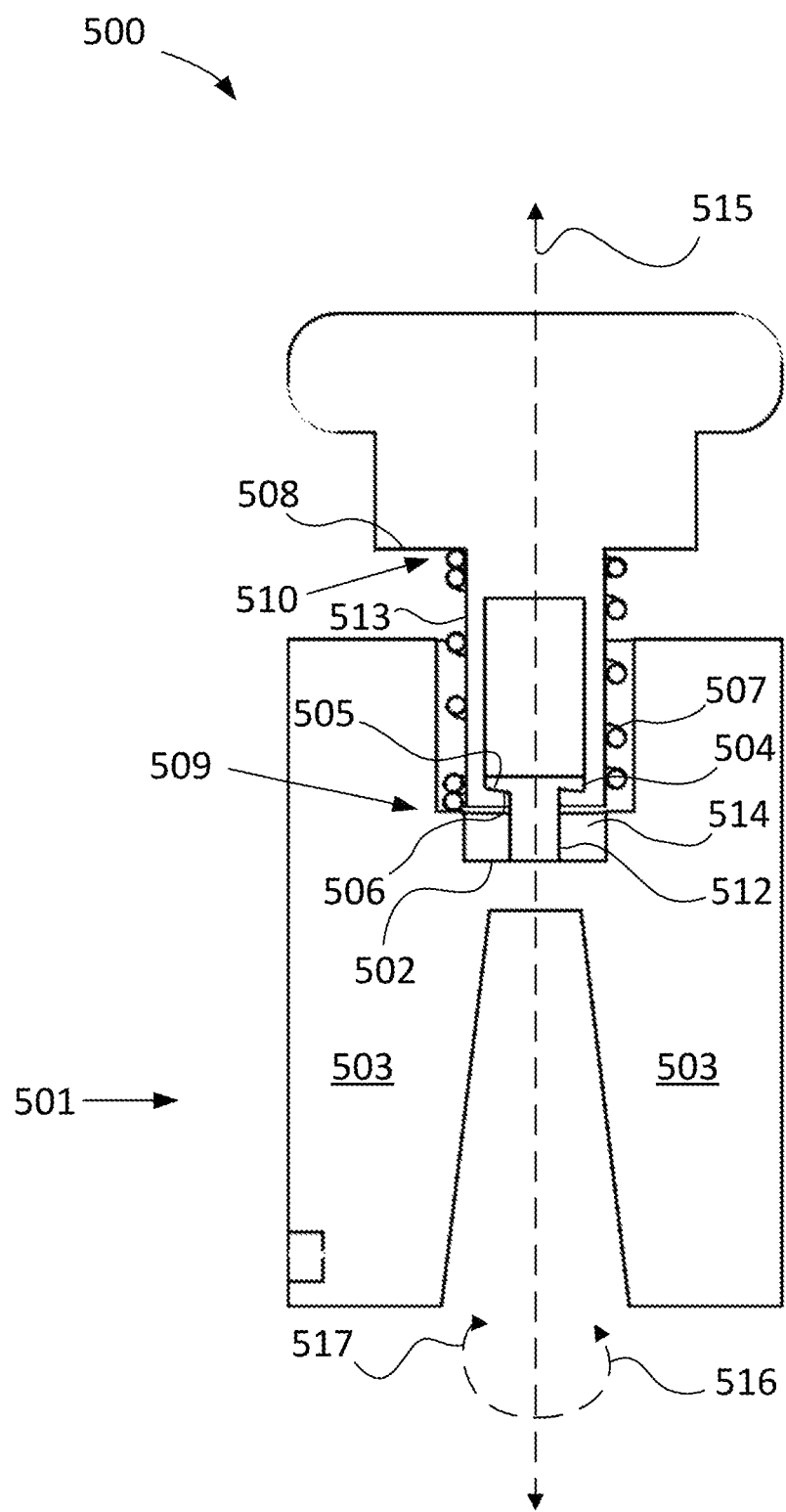
FIGS. 5A-B depict two cross-sectional views of a cable-winding apparatus as described herein.
Figure 5B:
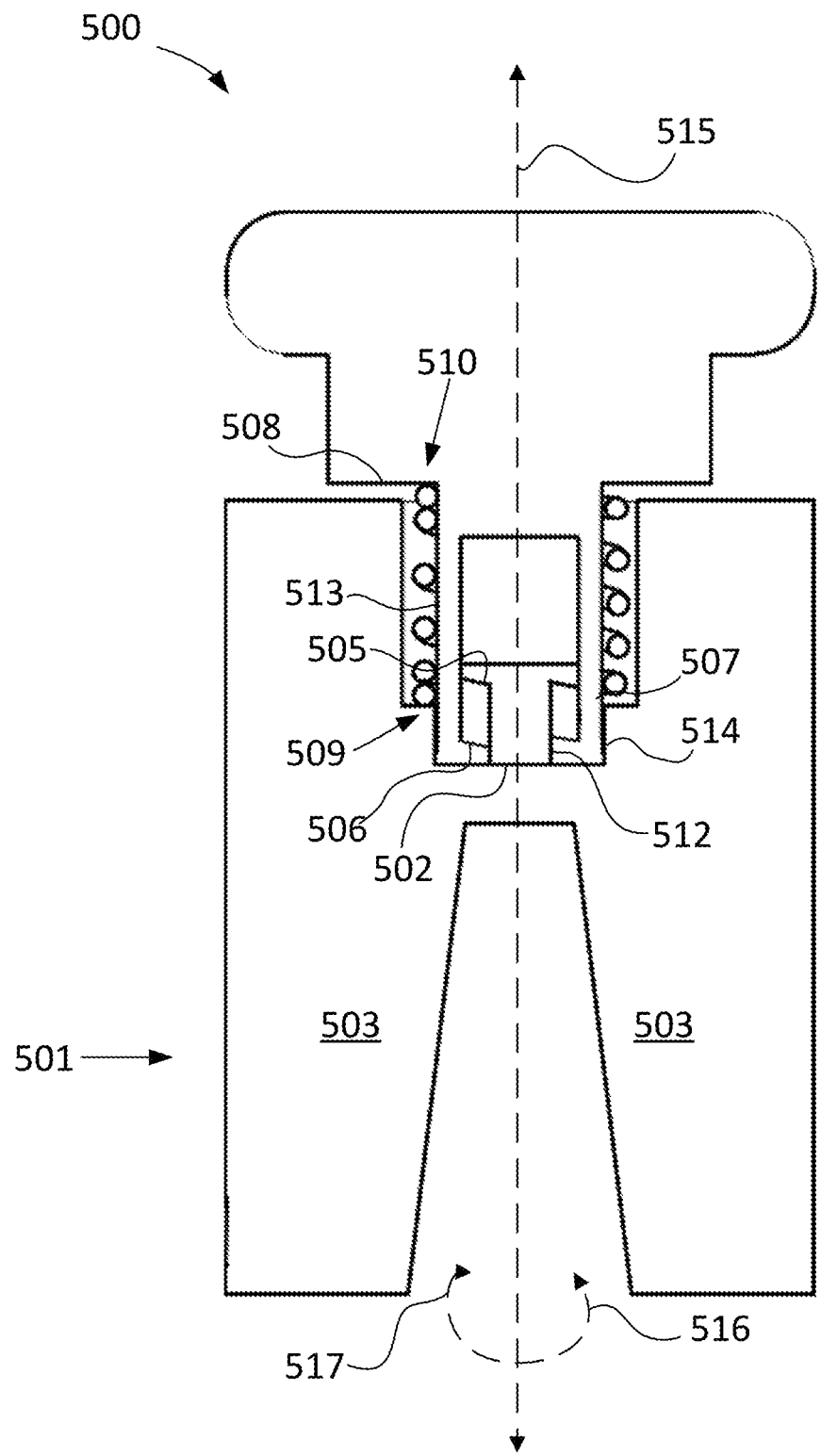

FIGS. 5A-B depict two cross-sectional views of a cable-winding apparatus as described herein. The apparatus 500 includes a channel 501 having a base 502 and two walls 503 extending perpendicularly from the base 502 along opposite sides of the base 502; a ratchet mechanism 504 having a first face gear 505 and a second face gear 506; a coil spring 507; and a securing surface of the locking pin 508. The ratchet mechanism 504 is disposed in the coil spring 507. The first and second face gears 505, 506 are coaxial about an axis 515 perpendicular to a face of each of the first and second face gears 505, 506. The first face gear 505 includes a plurality of ratchet teeth facing the channel 501. The second face gear 506 similarly includes a plurality of ratchet teeth facing the securing surface. The at least partially perpendicular walls of the cable-winding channel may comprise non-planar walls selected from the group consisting of ridges, grooves, channels, undulations, knurles, flutes, indentations, depressions, and hatches, or combinations thereof.

The coil spring 507 is fixed at a first end 509 to the channel base 502 opposite the channel walls, and is fixed at a second end 510 to the locking pin 508. The first face gear 505 is fixed to the channel 501 by a rod 512 that passes through the second face gear 506. The second face gear 506 is fixed to the locking pin 508 by a hollow shaft 513. The channel base 502 includes a cavity 514 into which the hollow shaft 513 passes as the channel 501 is pressed towards the locking pin 508. Similarly, the first face gear 505 and rod 512 travel in the hollow shaft 513 as the channel 501 is pressed towards the locking pin 508.

As shown in FIG. 5A, the spring 507 forces the channel 501 away from the securing surface of the locking pin 508. This also forces the plurality of first ratchet teeth against the plurality of second ratchet teeth, which prevents rotation of the channel 501 about the axis 515 in a first direction 516. However, because of the shapes of the teeth, rotation about the axis 515 in a second direction 517 opposite the first direction 516 is permitted. As shown in FIG. 5B, as the spring 507 is compressed, the pluralities of first and second ratchet teeth are disengaged, which permits rotation of the channel 501 with respect to the locking pin 508 in the first and second directions 516, 517. The spring 507 stores torsional energy as the teeth of the first and second face gears 505, 506 are engaged. The spring 507 rotates the channel 501 with respect to the locking pin 508 as the teeth of the first and second face gears are disengaged.

FIG. 6 depicts a cross-sectional view of a gravity-enabled cable-winding apparatus as described herein. The apparatus 600 includes a channel 601 having a base 602 and two walls 603 extending perpendicularly from the base 602 along opposite sides of the base 602; a ratchet mechanism 604 having a first face gear 605 and a second face gear 606; and a locking pin 607. The ratchet mechanism 604 is disposed between the channel 601 and the securing surface of the locking pin 607. The first and second face gears 605, 606 are coaxial about an axis 608 perpendicular to a face of each of the first and second face gears 605, 606. The first face gear 605 includes a plurality of ratchet teeth facing the channel 601. The second face gear 606 similarly includes a plurality of ratchet teeth facing the securing surface. The first face gear 605 is fixed to the channel 601 by a rod 609 that passes through the second face gear 606. The second face gear 606 is fixed to the locking pin 607 by a hollow shaft 610. The channel base 602 includes a cavity 611 into which the hollow shaft 610 passes as the channel 601 is pressed towards the securing surface of the locking pin 607. Similarly, the first face gear 605 and rod 609 travel in the hollow shaft 610 as the channel 601 is pressed towards the securing surface of the locking pin 607.

The embodiment of FIG. 6 differs from the embodiment of FIG. 5 in that the embodiment of FIG. 5 includes a spring 507 between the channel 501 and the securing surface of the locking pin 508. In the embodiment of FIG. 6, a weight of the channel 601 forces the channel 601 away from the securing surface of the locking pin 607. The weight of the channel 601 also forces the teeth of the first and second face gears 605, 606 against each other such that the teeth prevent rotation of the channel 601 with respect to the locking pin 607 in a first direction 612 while permitting rotation of the channel 601 with respect to the locking pin 607 in a second direction 613 opposite the first direction 612.

Figure 7:
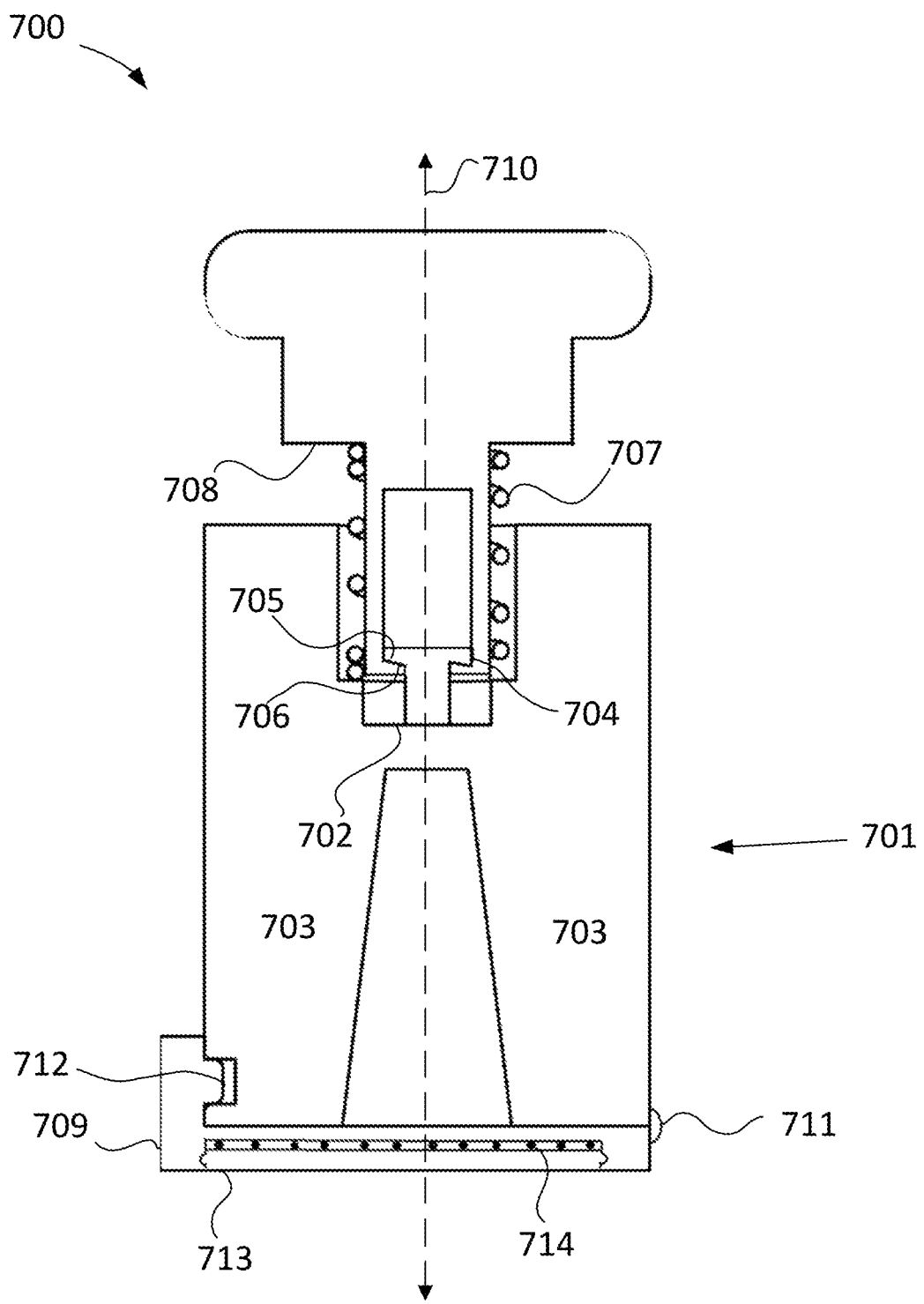
FIG. 7 depicts a cross-sectional view of a cable-winding apparatus embodiment with a lid.

FIG. 7 depicts a cross-sectional view of a cable-winding apparatus embodiment with a lid. The apparatus 700 includes a channel 701 having a base 702 and two walls 703 extending perpendicularly from the base 702 along opposite sides of the base 702; a ratchet mechanism 704 having a first face gear 705 and a second face gear 706; a coil spring 707; a locking pin 708; and an articulating lid 709. The ratchet mechanism 704 is disposed in the coil spring 707. The first and second face gears 705, 706 are coaxial about an axis 710 perpendicular to a face of each of the first and second face gears 705, 706. The first face gear 705 includes a plurality of ratchet teeth facing the channel 701. The second face gear 706 similarly includes a plurality of ratchet teeth facing the securing surface of the locking pin 708. The at least partially perpendicular walls of the cable-winding channel may comprise non-planar walls selected from the group consisting of ridges, grooves, channels, undulations, knurles, flutes, indentations, depressions, and hatches, or combinations thereof.

The articulating lid 709 is connected to one of the walls 703 by a hinge 711, which allows the lid 709 to articulate. The lid 709 is connected to the other wall 703 by a latch 712. As shown, the lid 709 is disposed opposite the base 702. The lid 709 includes a rotatable plate 713, which is made rotatable by bearings 714. Pressure on the plate 713 disengages the teeth of the first and second face gears 705, 706. As the spring 707 stores torsional energy and pressure is exerted on the plate 713, the spring 707 rotates the channel 701 with respect to the locking pin 708 and the plate 713.

Figure 8A:
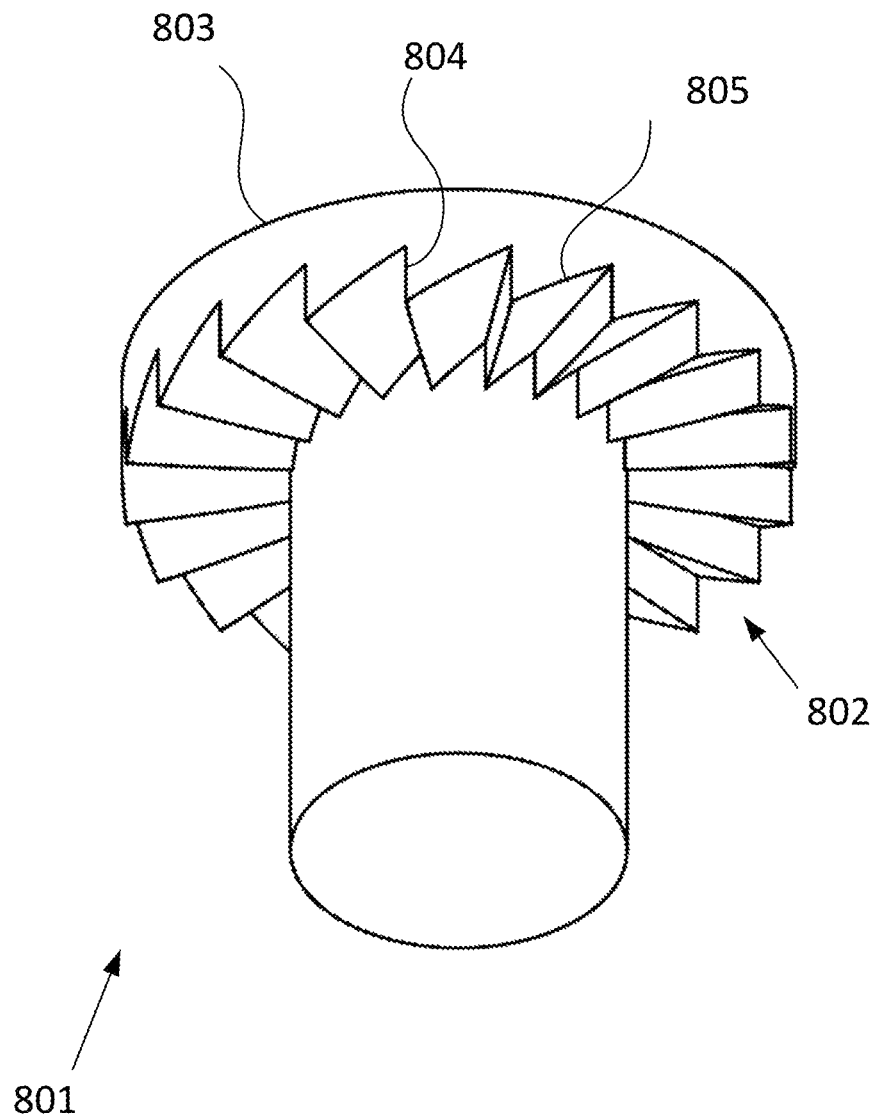
FIGS. 8A-B depict zoomed-in views of face gears for use in a cable-winding apparatus as described herein.
Figure 8B:
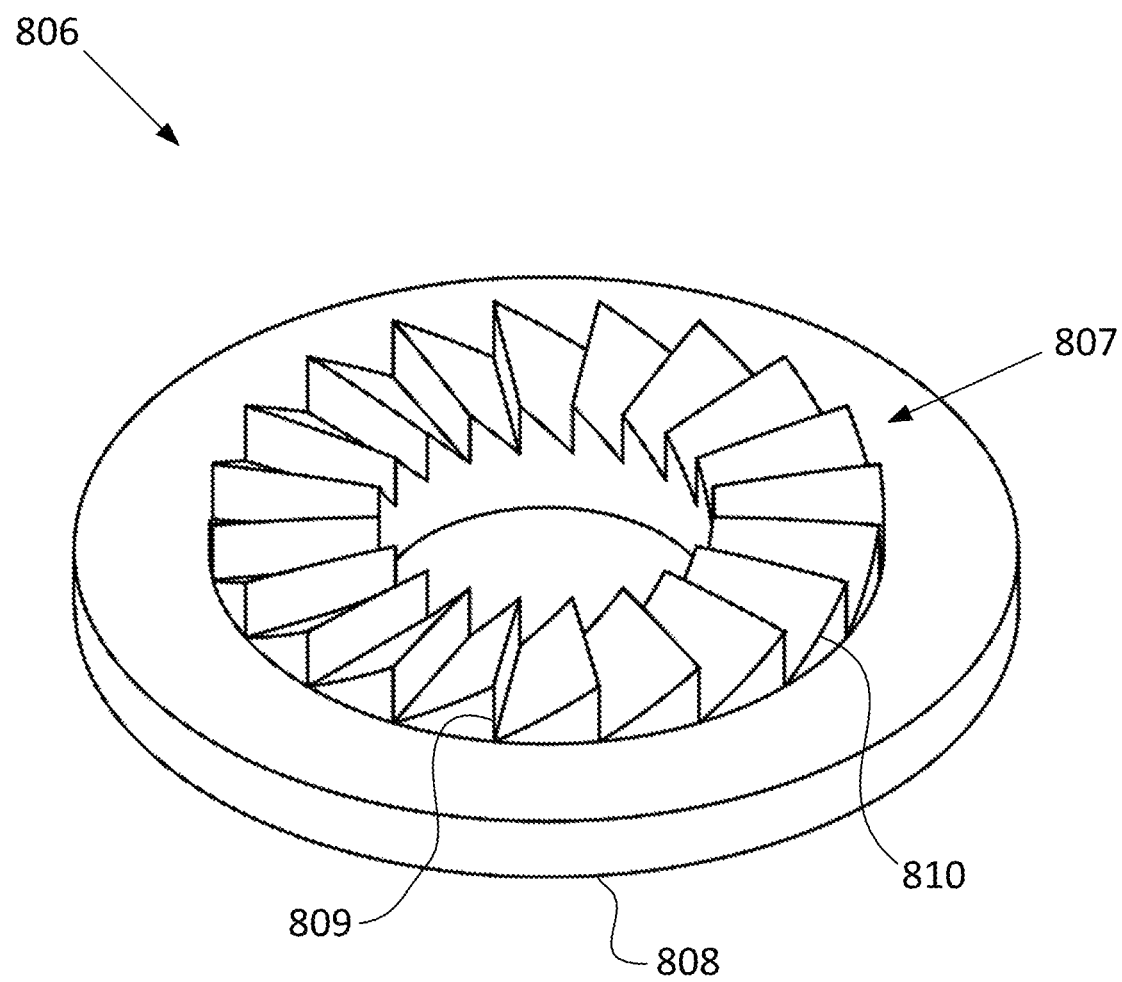

FIGS. 8A-B depict zoomed-in views of face gears for use in a cable-winding apparatus as described herein. FIG. 8A depicts a first face gear 801 that connects to a cable-winding channel. The first face gear 801 includes a first plurality of ratchet teeth 802 and a back face 803. The teeth 802 include a first side 804 that is perpendicular to the back face 803, and a second side 805 that intersects the back face 803 at a less-than-perpendicular angle. The angle may range from one degree to 80 degrees. FIG. 8B depicts a second face gear 806 that connects to a securing surface. The second face gear 806 includes a second plurality of ratchet teeth 807 and a back face 808. The teeth 807 include a first side 809 that is perpendicular to the back face 808, and a second side 810 that intersects the back face 808 at the less-than-perpendicular angle.

We claim:

1. A cable-winding apparatus, comprising:
   a securing surface;
   a cable-winding channel rotatably connected to the securing surface, wherein the cable-winding channel comprises a base and two or more walls extending at least partially perpendicularly from the base along opposite sides of the base;
   a coil spring fixed at a first end to the base opposite the walls, and fixed at a second end to the securing surface; and
   a ratchet mechanism disposed in the spring, the ratchet mechanism comprising:
     a first face gear fixed to the channel by a rod, wherein the first face gear comprises a plurality of first ratchet teeth facing the securing surface; and
     a second face gear fixed to the securing surface wherein the second face gear comprises a plurality of second ratchet teeth facing the cable-winding channel, wherein the rod fixing the first face gear to the channel passes through the second face gear, wherein the coil spring forces the cable-winding channel away from the securing surface and forces the plurality of first ratchet teeth against the plurality of second ratchet teeth such that the pluralities of first and second ratchet teeth prevent rotation of the cable-winding channel with respect to the securing surface in a first direction while permitting rotation of the cable-winding channel with respect to the securing surface in a second direction opposite the first direction.

2. The cable-winding apparatus of claim 1, wherein the securing surface comprises a second channel.

3. The cable-winding apparatus of claim 2, wherein the cable-winding channel is disposed within the second channel.

4. The cable-winding apparatus of claim 2, wherein the cable-winding channel is disposed completely within the second channel.

5. The cable-winding apparatus of claim 2, wherein the second channel comprises a device-mounting channel, the device-mounting channel comprising one or more surface-mounting openings through which screws pass that mount the device-mounting channel to a surface, and one or more device-mounting openings by which one or more devices are mounted to the device-mounting channel.

6. The cable-winding apparatus of claim 2, wherein the second channel comprises a second-channel base, two second-channel walls extending perpendicularly from opposite sides of the second-channel base, and at least one detent protruding from an inner surface, and outer surface, or both, of each second-channel wall.

7. The cable-winding apparatus of claim 1, wherein one or more teeth of the pluralities of first and second ratchet teeth comprise a first side perpendicular to a face of the corresponding face gear and a second side intersecting the face of the corresponding face gear at an angle ranging from one degree to 80 degrees.

8. The cable-winding apparatus of claim 1, wherein the spring stores torsional energy as the first and second gear faces are engaged, and wherein the spring rotates the cable-winding channel with respect to the securing surface as the first and second gear faces are disengaged.

9. The cable-winding apparatus of claim 1, further comprising an articulating lid connected to one of the walls by a hinge and the another of the walls by a latch, the lid disposed opposite the base.

10. The cable-winding apparatus of claim 9, the articulating lid further comprising a rotatable plate, wherein pressure on the plate disengages the pluralities of first and second ratchet teeth and, wherein, as the spring stores torsional energy and a pressure is exerted on the plate disengaging the pluralities of first and second ratchet teeth, the spring rotates the channel with respect to the securing surface and the rotatable plate.

11. The cable-winding apparatus of claim 1, the cable-winding channel further comprising one or more fingers extending outwards from at least one of the walls, wherein a force on the finger rotates channel about an axis perpendicular to a face of each of the first and second face gears.

12. The cable-winding apparatus of claim 1, wherein the at least partially perpendicular walls of the cable-winding channel comprise a non-planar surface selected from the group consisting of grooves, flutes, channels, indentations, knurls, undulations and combination thereof.

* * * * *